(12) United States Patent
Chen

(10) Patent No.: US 10,838,269 B2
(45) Date of Patent: Nov. 17, 2020

(54) CURVED DISPLAY PANEL AND DISPLAY DEVICE

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 49 days.

(21) Appl. No.: 16/313,882

(22) PCT Filed: Oct. 23, 2017

(86) PCT No.: PCT/CN2017/107261
§ 371 (c)(1),
(2) Date: Dec. 27, 2018

(87) PCT Pub. No.: WO2019/019439
PCT Pub. Date: Jan. 31, 2019

(65) Prior Publication Data
US 2020/0142264 A1    May 7, 2020

(30) Foreign Application Priority Data
Jul. 25, 2017    (CN) .......................... 2017 1 0611863

(51) Int. Cl.
*G09G 3/36*    (2006.01)
*G02F 1/1343*    (2006.01)
*G02F 1/1335*    (2006.01)

(52) U.S. Cl.
CPC .. *G02F 1/134336* (2013.01); *G02F 1/133512* (2013.01); *G02F 1/133514* (2013.01)

(58) Field of Classification Search
CPC ...... G02F 1/13; G09G 3/36; G09G 2300/023; G09G 3/32
See application file for complete search history.

(56) References Cited

U.S. PATENT DOCUMENTS

2008/0198282 A1* 8/2008 Su .................... G09G 3/3648
349/37
2016/0116811 A1* 4/2016 Zheng ................. G02F 1/1362
349/38

(Continued)

FOREIGN PATENT DOCUMENTS

| CN | 104330910 A | 2/2015 |
|---|---|---|
| CN | 105116658 A | 12/2015 |
| CN | 105446016 A | 3/2016 |

*Primary Examiner* — Pegeman Karimi

(57) ABSTRACT

A curved display panel is provided. The curved display panel includes a first substrate, a second substrate, and a liquid crystal layer. The first substrate has a plurality of matrix-arranged pixel units. Each pixel unit includes a main pixel region, a sub-pixel region, and pixel electrodes. In each of the pixel unit, the ratio of the area of the main pixel region to the area of the sub-pixel region is not the same. The pixel electrodes are disposed on the main pixel region and the sub-pixel region. The voltage of the pixel electrode of the main pixel region is different from the voltage of the pixel electrode of the sub-pixel region. The liquid crystal layer is disposed between the first substrate and the second substrate. A display device is provided.

13 Claims, 4 Drawing Sheets

(56) References Cited

U.S. PATENT DOCUMENTS

| | | | |
|---|---|---|---|
| 2018/0095335 A1* | 4/2018 | Woo | G02F 1/1368 |
| 2018/0212200 A1* | 7/2018 | Wang | C09D 4/00 |
| 2019/0140026 A1* | 5/2019 | Nakanishi | H01L 27/3272 |
| 2019/0278142 A1* | 9/2019 | Oh | G02F 1/134309 |
| 2020/0014902 A1* | 1/2020 | Chen | H04N 13/125 |
| 2020/0035183 A1* | 1/2020 | Hou | G09G 3/3677 |

* cited by examiner

CURVED DISPLAY PANEL AND DISPLAY DEVICE

TECHNICAL FIELD

The present disclosure relates to the field of electronic technology, and more particularly to a curved display panel and a display device.

BACKGROUND

More and more liquid crystal panels on the market are applied to 3D displays. The 3D displays are a new generation of 3D display devices built on the stereoscopic vision mechanism of the human eye. It can make excellent use of multi-channel automatic stereoscopic reality technology, without using any vision aid device (such as, 3D glasses, helmets, etc.), to get the full depth of the image.

With the development of the curved technology of displays, curved 3D displays have gradually become a new trend of development, such as TVs, monitors and mobile phones. A lot of designers develop and research the design of a curved display. However, the greater the curvature of the curved display, the larger visual angle or the more obvious color cast. Thus, for the curved display, the problem of color cast will greatly affect the user experience.

SUMMARY

The primary object of the present disclosure is to provide a curved display panel and a display device to effectively improve the display effect of the curved display panel, reduce the occurrence of color cast, and greatly improve the user experience.

According to one aspect of the present disclosure, a curved display panel is provided. The curved display panel includes a first substrate, a second substrate, and a liquid crystal layer. The first substrate has a plurality of matrix-arranged pixel units. Each pixel unit includes a main pixel region, a sub-pixel region, and pixel electrodes. In each of the pixel units, the ratio of the area of the main pixel region to the area of the sub-pixel region is not the same. The pixel electrodes are disposed on the main pixel region and the sub-pixel region. The voltage of the pixel electrode of the main pixel region is different from the voltage of the pixel electrode of the sub-pixel region. The liquid crystal layer is disposed between the first substrate and the second substrate.

According to another aspect of the present disclosure, a curved display panel is provided. The curved display panel includes a first substrate, a second substrate, and a liquid crystal layer. The first substrate has a plurality of matrix-arranged pixel units. Each pixel unit includes a main pixel region, a sub-pixel region, and pixel electrodes. In each of the pixel units, the ratio of the area of the main pixel region to the area of the sub-pixel region is not the same. The pixel electrodes are disposed on the main pixel region and the sub-pixel region. The voltage of the pixel electrode of the main pixel region is different from the voltage of the pixel electrode of the sub-pixel region. The liquid crystal layer is disposed between the first substrate and the second substrate. Wherein, in each of the pixel units, the ratio of the area of the main pixel region to the area of the sub-pixel region varies with the curvature of the first substrate. The second substrate includes a bottom plate, a black matrix and a plurality of color filters. The black matrix has a plurality of openings. The color filters are disposed on the bottom plate. Each of the color filters corresponds to a respective one of the openings. Every adjacent two of the color filters correspond to different ones of the pixel units, respectively.

According to a further aspect of the present disclosure, a display device is provided. The display device includes a curved display panel and a phase retardation film. The curved display panel includes a first substrate, a second substrate, and a liquid crystal layer. The first substrate has a plurality of matrix-arranged pixel units. Each pixel unit includes a main pixel region, a sub-pixel region, and pixel electrodes. In each of the pixel units, the ratio of the area of the main pixel region to the area of the sub-pixel region is not the same. The pixel electrodes are disposed on the main pixel region and the sub-pixel region. The voltage of the pixel electrode of the main pixel region is different from the voltage of the pixel electrode of the sub-pixel region. The liquid crystal layer is disposed between the first substrate and the second substrate. The phase retardation film is disposed on a surface of the second substrate.

The embodiments of the present disclosure can effectively improve the display effect of the curved display panel, in particular, the display effect of the display device including the above-described curved display panel, and reduce the occurrence of color cast, and greatly improve the user experience. Especially, In each of the pixel units, the ratio of the area of the main pixel region to the area of the sub-pixel region is not the same, which not only avoids the occurrence of color cast during the process of watching but also reduces the use of external components.

BRIEF DESCRIPTION OF THE DRAWINGS

In order to clearly illustrate the embodiments of the present disclosure or the technical solutions in the existing technology, the following drawings, which are used in the description, are briefly described. The accompanying drawings in the following description are merely illustrative embodiments of the present disclosure. For those skilled in the art, the drawings of other embodiments may be obtained according to the accompanying drawings under the premise of not paying creative work.

DESCRIPTION OF THE EMBODIMENTS

The technical solution in the embodiments of the present disclosure will be described in detail below in conjunction with the accompanying drawings. It will be apparent that the described embodiments are merely part of the embodiments of the present disclosure and not all embodiments. For those skilled in the art, other embodiments may be obtained based on the embodiments of the present disclosure under the premise of not paying creative work, without departing from the scope of the present disclosure.

It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof.

It will be further understood that the terminology used herein is for the purpose of describing particular embodiments only and is not intended to be limiting of the present disclosure. As used herein, the singular forms "a," "an," and "the" are intended to include the plural forms as well, unless the context clearly indicates otherwise. As used in the description and the appended claims, the term "and/or" includes any and all combinations of one or more of the associated listed items.

Figure 1:
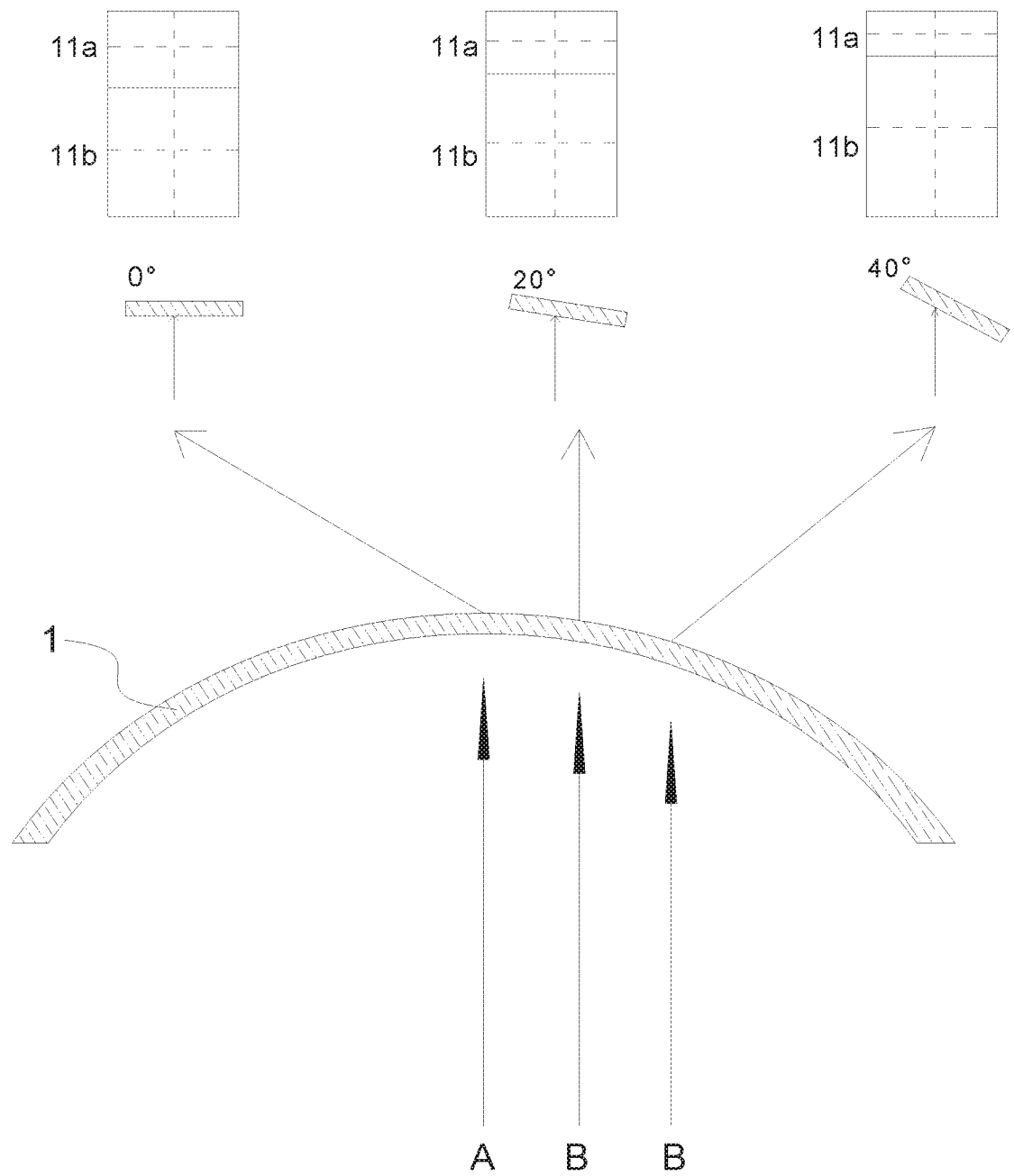
FIG. 1 is a structural schematic view of a curved display panel in accordance with an embodiment of the present disclosure.
Figure 2:
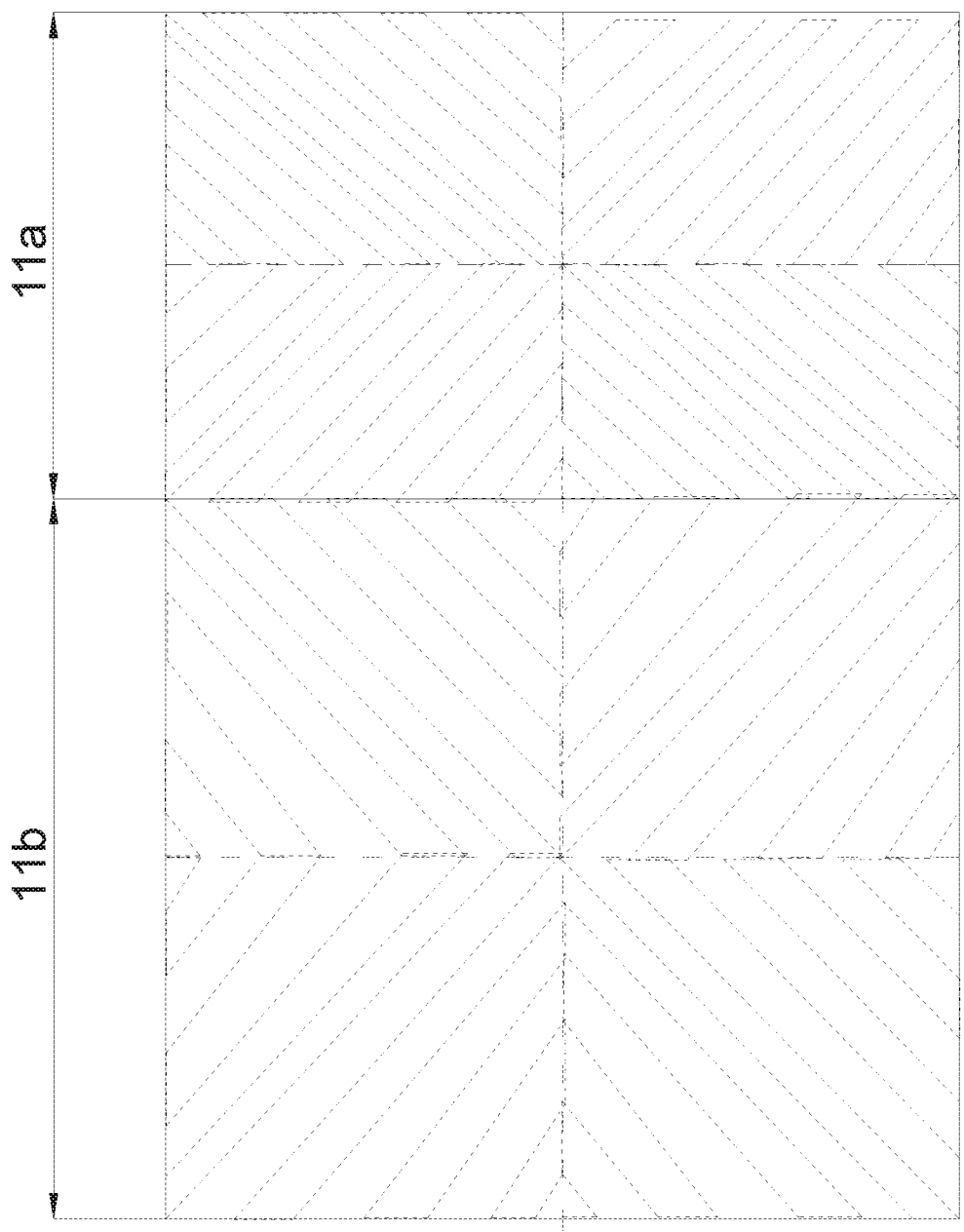
FIG. 2 is a structural schematic view of a pixel unit in accordance with an embodiment of the present disclosure.
Figure 3:
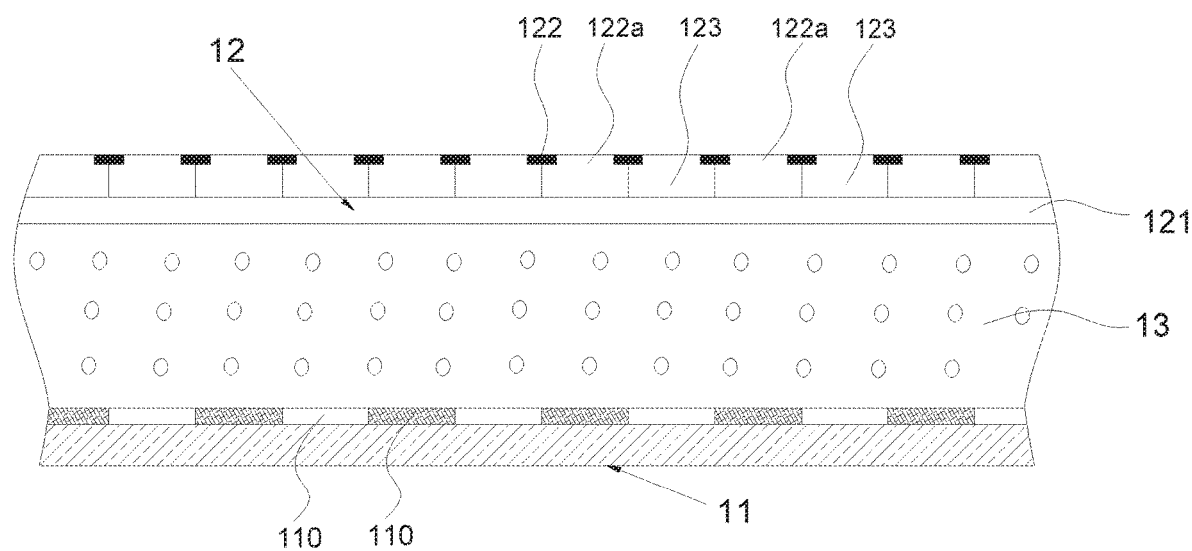
FIG. 3 is another structural schematic view of a curved display panel in accordance with an embodiment of the present disclosure.

Referring to FIG. 1, FIG. 2 and FIG. 3, a curved display panel in accordance with an embodiment of the present embodiment includes a first substrate 11, a second substrate 12, and a liquid crystal layer 13.

The first substrate 11 has a plurality of matrix-arranged pixel units 110. Each of the pixel units 110 includes a main pixel region 11a, a sub-pixel region 11b, and pixel electrodes. In each of the pixel units, the ratio of the area of the main pixel region 11a to the area of the sub-pixel region 11b is not the same. The pixel electrodes are disposed on the main pixel region and the sub-pixel region. The voltage of the pixel electrode of the main pixel region is different from the voltage of the pixel electrode of the sub-pixel region. The liquid crystal layer 13 is disposed between the first substrate 11 and the second substrate 12. The pixel electrodes may be made of a transparent conductive material or other materials.

The liquid crystal molecules of the liquid crystal layer 13 can present at different angles depending on the voltage of the pixel electrode, so that the image information in different directions can be displayed. When the area of the main pixel area and the sub-pixel area of each pixel unit is different, it means that the number of liquid crystal molecules at different angles also changes accordingly, so the final display result is different. Thus, when the image information transmitted from the curved display panel in different directions is received by the user, it will avoid the occurrence of color cast, thereby improving the user experience.

Optionally, in the pixel unit 110, the ratio of the area of the main pixel region 11a to the area of the sub-pixel region 11b varies with the curvature of the first substrate 11. Wherein, most of the existing display panels are curved display panels to achieve the 3D effect. The color cast of the curved display panel is more severe than the flat display panel. In order to avoid unnecessary color cast, the ratio of the area of the main pixel region 11a to the area of the sub-pixel region 11b is set according to the actual situation.

Optionally, the first substrate 11 is provided with a main view point A. In the pixel unit 110 corresponding to the main view point A, the ratio of the area of the main pixel region 11a to the area of the sub-pixel region 11b is 4:6. Normally, the user faces the curved display panel for watching, the position of the curved display panel corresponding to the position of the user is defined as the main view point, and the points at the left and right sides of the main view point are defined as side view points. Of course, the main view point may be the intersection of any normal line and a tangent line on the curved display panel corresponding to the position of the user.

Optionally, the first substrate 11 is provided with a plurality of side view points B. In the pixel unit 110 corresponding to the side view point B, the ratio of the area of the main pixel region 11a to the area of the sub-pixel region 11b varies with the angle between the normal line of the each side view point B and the normal line of the main view point A. Wherein, in the pixel unit 110 corresponding to the side view point B, the ratio of the area of the main pixel region 11a to the area of the sub-pixel region 11b varies with the angle between the normal line of each side view point B and the normal line of the main view point A, which can eliminate the color cast more effectively and improve the user experience.

In particular, when the angle between the normal line of the side view point B and the normal line of the main view point A is 20°, in the pixel unit 110 corresponding to the side view point B, the ratio of the area of the main pixel region 11a to the area of the sub pixel region 11b is 4.5:5.5. The setting of this ratio allows the user to visually watch the image displayed on the curved display panel, reducing a certain color cast.

When the angle between the normal line of the side view point B and the normal line of the main view point A is 40°, in the pixel unit 110 corresponding to the side view point B, the ratio of the area of the main pixel region 11a to the area of the sub pixel region 11b is 4.8:5.2. Similarly, a certain color cast is reduced to improve the user experience.

Furthermore, the second substrate 12 includes a bottom plate 121, a black matrix 122, and a plurality of color filters 123. The black matrix 122 has a plurality of openings 122a. The color filters 123 are disposed on the bottom plate 121. Each of the color filters 123 corresponds to a respective one of the openings 122a. Every adjacent two of the color filters 123 correspond to different pixel units 110, respectively. Each of the openings also corresponds to a different pixel unit accordingly. Thus, different pixel units can be set differently according to the actual situation of use to realize the 3D effect, reduce the color cast, and improve the user experience.

Figure 4:
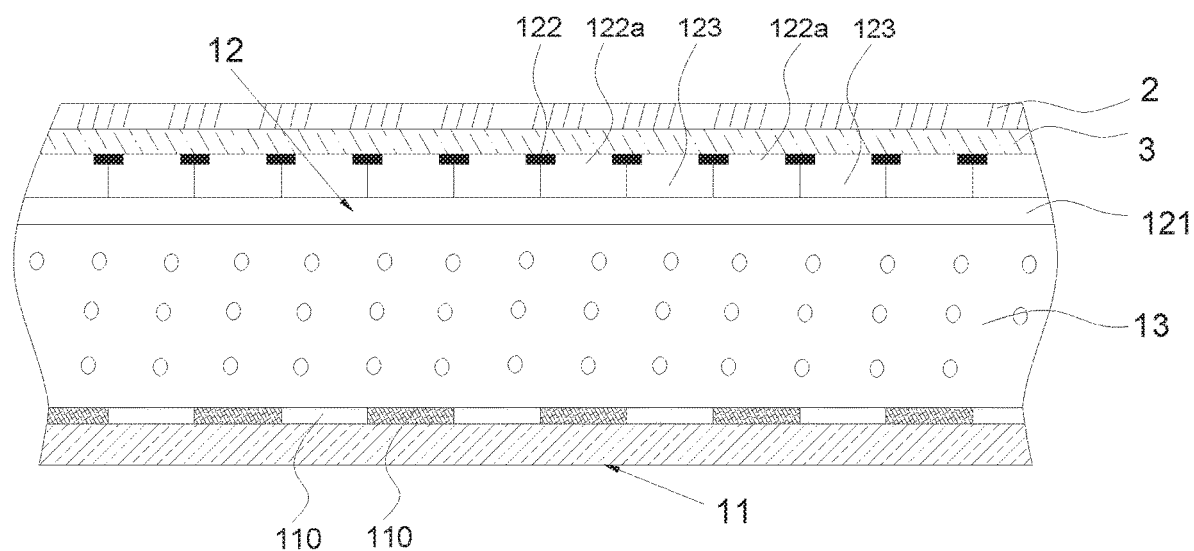
FIG. 4 is a structural schematic view of a display device in accordance with an embodiment of the present disclosure.

Besides, as shown in FIG. 4, a display device in accordance with an embodiment of the present disclosure includes a curved display panel 1 as described above and a phase retardation film 2. Wherein, the phase retardation film 2 is disposed on the surface of the second substrate 12. Optionally, the display device further includes a polarizer 3. The polarizer 3 is disposed between the second substrate 12 and the phase retardation film 2.

Wherein, the curved display panel 1 includes a first substrate 11, a second substrate 12, and a liquid crystal layer 13. The first substrate 11 has a plurality of matrix-arranged pixel units 110. Each of the pixel units 110 includes a main pixel region 11a, a sub-pixel region 11b, and pixel electrodes. In each of the pixel units, the ratio of the area of the main pixel region 11a to the area of the sub-pixel region 11b is not the same. The pixel electrodes are disposed on the main pixel region and the sub-pixel region. The voltage of the pixel electrode of the main pixel region is different from the voltage of the pixel electrode of the sub-pixel region. The liquid crystal layer 13 is disposed between the first substrate 11 and the second substrate 12. The curved display panel 1 may be a liquid crystal display panel.

The functions of the respective components in the curved display panel 1, the mating relationships and the working principle thereof are described in detail in the aforesaid embodiment, and will not be described again.

In summary, the embodiments of the present disclosure can effectively improve the display effect of the curved display panel, in particular, the display effect of the display device using the above-described curved display panel, and reduce the occurrence of color cast, and greatly improve the user experience. Especially, in each of the pixel units, the ratio of the area of the main pixel region to the area of the sub-pixel region is not the same, which not only avoids the occurrence of color cast during the process of watching but also reduces the use of external components.

The embodiments described above are merely illustrative of several embodiments of the present disclosure and are more specific and detailed, but are not to be construed as limiting the scope of the present disclosure. It should be noted that it will be apparent to those skilled in the art that various modifications and improvements can be made therein without departing from the spirit of the present disclosure, and all of which are within the scope of the present application. Accordingly, the present disclosure is not to be limited except as by the appended claims.

What is claimed is:

1. A curved display panel, comprising:
   a first substrate, comprising a plurality of matrix-arranged pixel units, wherein each of the pixel units comprises a main pixel region, a sub-pixel region and pixel electrodes, and in each of the pixel units, the ratio of the area of the main pixel region to the area of the sub-pixel region is not the same; the pixel electrodes is disposed on the main pixel region and the sub-pixel region; and the voltage of the pixel electrode of the main pixel region is different from the voltage of the pixel electrode of the sub-pixel region;
   a second substrate; and
   a liquid crystal layer, disposed between the first substrate and the second substrate;
   wherein in each of the pixel units, the ratio of the area of the main pixel region to the area of the sub-pixel region varies with the curvature of the first substrate;
   wherein the first substrate is provided with a main view point, and in the pixel unit corresponding to the main view point, the ratio of the area of the main pixel region to the area of the sub-pixel region is 4:6; and
   wherein the first substrate is provided with a plurality of side view points, and in the pixel unit corresponding to the side view point, the ratio of the area of the main pixel region to the area of the sub-pixel region varies with the angle between a normal line of each side view point and a normal line of the main view point.

2. The curved display panel of claim 1, wherein when the angle between the normal line of the side view point and the normal line of the main view point is 20°, in the pixel unit corresponding to the side view point, the ratio of the area of the main pixel region to the area of the sub pixel region is 4.5:5.5.

3. The curved display panel of claim 2, wherein when the angle between the normal line of the side view point and the normal line of the main view point is 40°, in the pixel unit corresponding to the side view point, the ratio of the area of the main pixel region to the area of the sub pixel region is 4.8:5.2.

4. The curved display panel of claim 1, wherein the pixel electrodes are made of a transparent conductive material.

5. The curved display panel of claim 1, wherein the second substrate comprises a bottom plate, a black matrix and a plurality of color filters, the black matrix has a plurality of openings, the color filters are disposed on the bottom plate, each of the color filters corresponds to a respective one of the openings, and every adjacent two of the color filters correspond to different ones of the pixel units, respectively.

6. A display device, comprising a curved display panel and a phase retardation film, wherein the curved display panel comprises:
   a first substrate, comprising a plurality of matrix-arranged pixel units, wherein each of the pixel units comprises a main pixel region, a sub-pixel region and pixel electrodes, and in each of the pixel units, the ratio of the area of the main pixel region to the area of the sub-pixel region is not the same; the pixel electrodes is disposed on the main pixel region and the sub-pixel region; and the voltage of the pixel electrode of the main pixel region is different from the voltage of the pixel electrode of the sub-pixel region;
   a second substrate; and
   a liquid crystal layer, disposed between the first substrate and the second substrate;
   wherein the phase retardation film is disposed on a surface of the second substrate;
   wherein in each of the pixel units, the ratio of the area of the main pixel region to the area of the sub-pixel region varies with the curvature of the first substrate;
   wherein the first substrate is provided with a main view point, and in the pixel unit corresponding to the main view point, the ratio of the area of the main pixel region to the area of the sub-pixel region is 4:6; and
   wherein the first substrate is provided with a plurality of side view points, and in the pixel unit corresponding to the side view point, the ratio of the area of the main pixel region to the area of the sub-pixel region varies with the angle between a normal line of each side view point and a normal line of the main view point.

7. The display device of claim 6, wherein the pixel electrodes are made of a transparent conductive material.

8. The display device of claim 6, wherein the second substrate comprises a bottom plate, a black matrix and a plurality of color filters, the black matrix has a plurality of openings, the color filters are disposed on the bottom plate, each of the color filters corresponds to a respective one of the openings, and every adjacent two of the color filters correspond to different ones of the pixel units, respectively.

9. The display device of claim 6, wherein when the angle between the normal line of the side view point and the normal line of the main view point is 20°, in the pixel unit corresponding to the side view point, the ratio of the area of the main pixel region to the area of the sub pixel region is 4.5:5.5.

10. The display device of claim 9, wherein when the angle between the normal line of the side view point and the normal line of the main view point is 40°, in the pixel unit corresponding to the side view point, the ratio of the area of the main pixel region to the area of the sub pixel region is 4.8:5.2.

11. The display device of claim 10, wherein the pixel electrodes are made of a transparent conductive material.

12. The display device of claim 11, wherein the second substrate comprises a bottom plate, a black matrix and a plurality of color filters, the black matrix has a plurality of openings, the color filters are disposed on the bottom plate, each of the color filters corresponds to a respective one of the openings, and every adjacent two of the color filters correspond to different ones of the pixel units, respectively.

13. The display device of claim 6, further comprising a polarizer, the polarizer being disposed between the second substrate and the phase retardation film.

* * * * *